Figure 1:
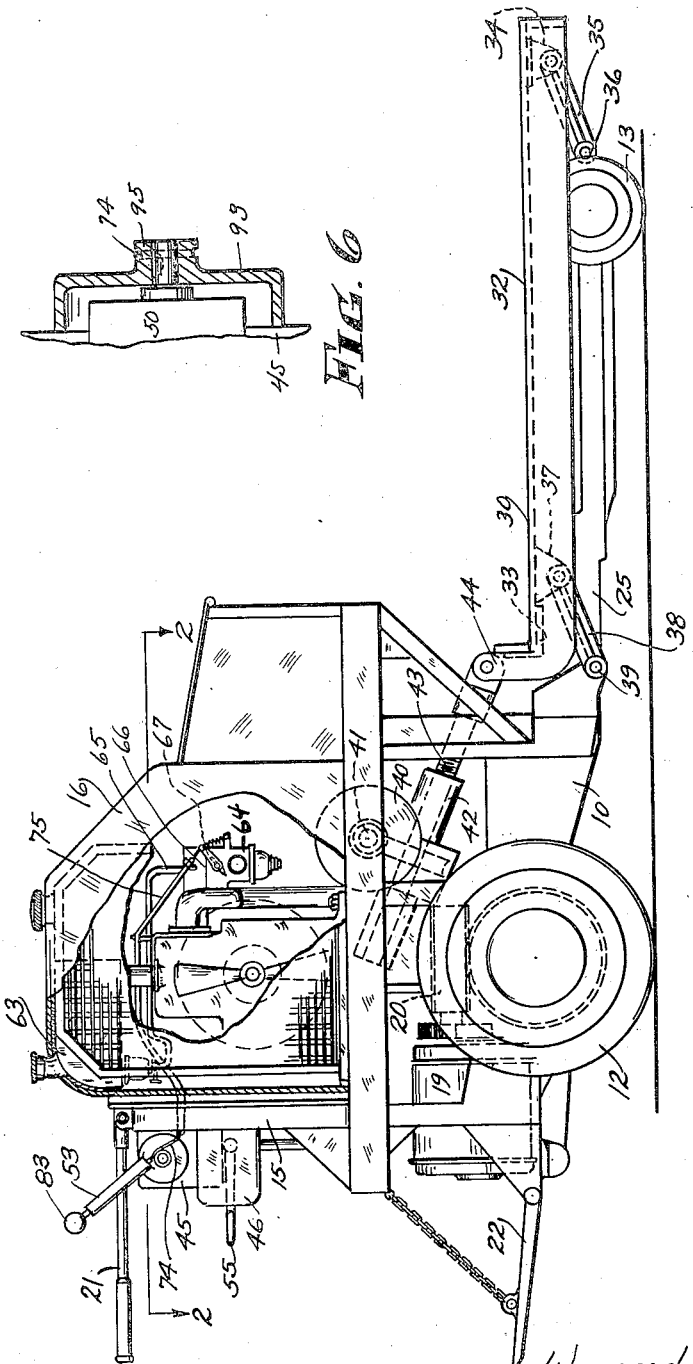

July 5, 1932.  W. D. PARKER  1,865,784
INDUSTRIAL TRUCK
Filed April 4, 1931   2 Sheets-Sheet 2
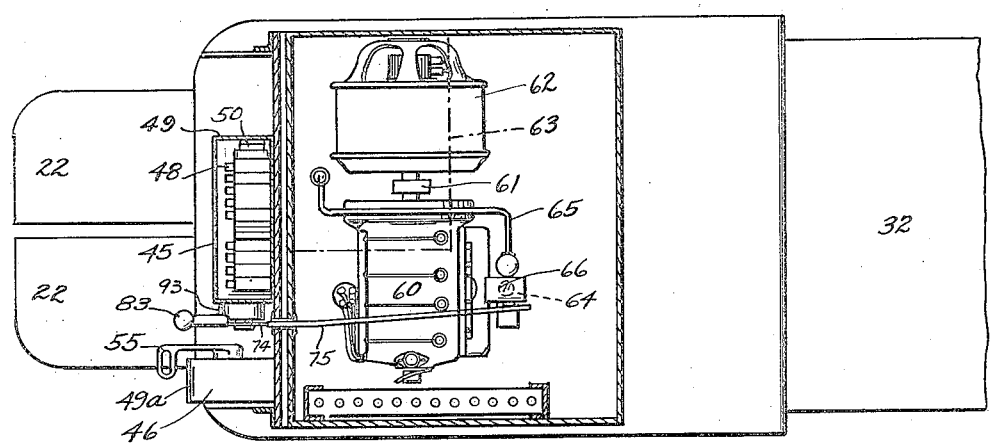
Fig. 2
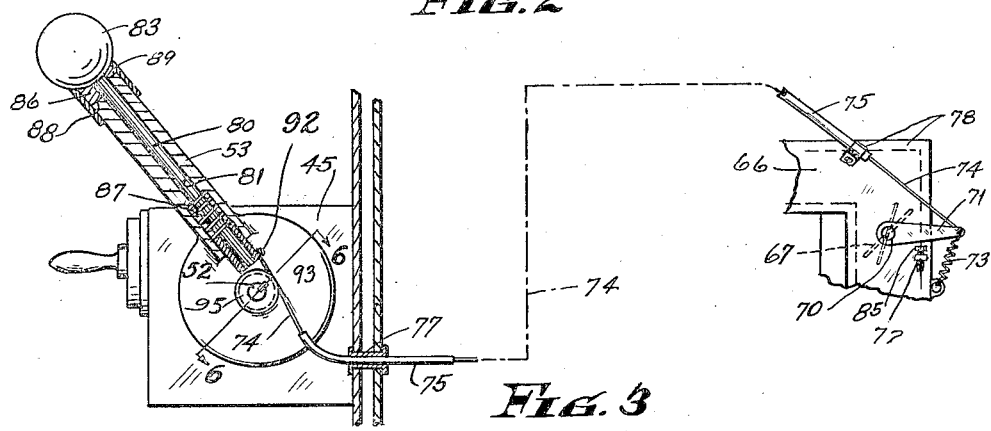
Fig. 3
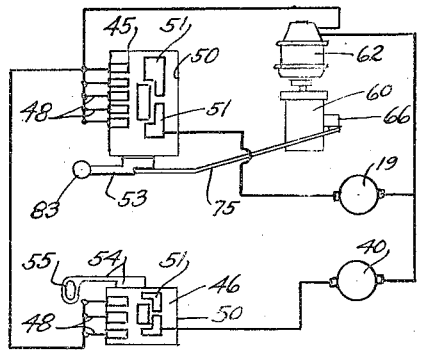
Fig. 4
Fig. 5
Inventor
Waveard D. Parker
By Bates, Golrick & Teare
Attorneys Patented July 5, 1932

1,865,784

UNITED STATES PATENT OFFICE

WAVEARD D. PARKER, OF BAY VILLAGE, OHIO, ASSIGNOR TO THE ELWELL PARKER ELECTRIC COMPANY, OF CLEVELAND, OHIO, A CORPORATION OF OHIO

INDUSTRIAL TRUCK

Application filed April 4, 1931. Serial No. 527,840.

This invention relates to an industrial truck of the gas electric propelled type, wherein the truck is propelled and the load lifted or otherwise handled by means of a gasoline-electric motor unit. Such trucks generally utilize one electric motor for propelling the truck, a second electric motor for handling the load, and a gas engine and electric generator to supply both electric motors with electrical energy. Independent controls are generally provided for each electric motor, and the gas engine or motor generator unit. The generator unit is so constructed that when the gas engine is running at an idle speed, or in other words at its slowest running speed, the generator unit will generate substantially no electrical energy. Hence, when the operator desires to either propel the truck or lift or otherwise handle a load thereon, he must first operate the gas engine control to increase the speed of the motor generator to a point where sufficient electrical energy will be provided to operate either one of the electric motors desired, and then he must operate the respective electric motor control until the load is lifted and transported, when the electric motor control, as well as the motor generator control, will be returned to the idle positions.

It has been found that in such installations, especially where the truck is standing idle during a considerable portion of the time, at which time the motor generator control should be in an idle position, that the operator fails to return the motor generator control to such idle position, thereby causing an unnecessary consumption of gasoline, undue wear on the motor generator unit, both of which increase the cost of operation of the truck. Hence it is desirable to provide a common control for the propelling motor and the gas engine. Such a control is shown in Patent No. 1,670,007, issued to C. H. Rasmussen et al, May 15, 1928. The control system shown in said patent has, however, many disadvantages when used on an industrial truck, which the present invention overcomes.

As an industrial truck does not run on rails, it often encounters roads and grades which require more than normal power. Likewise the load handling motor requires considerably more electrical energy than does the tools shown in the above mentioned patent. Hence, such a control system, as shown in said patent, is extremely limited when applied to an industrial truck of the type illustrated in the present application. Therefore, the general object of the present invention is to provide a control system which may readily be adapted to the conditions encountered in an industrial truck and overcome the disadvantage of systems used in the past.

A more specific object is to provide a generator controller for an industrial truck having a gas-electric generator unit, a motor to propel the truck, a motor for load handling purposes and independent controllers for such electric motors, which generator controller will automatically increase the speed of the gasoline motor to increase the output of the generator as the controller for the vehicle propelling motor is advanced to propel the truck, but which generator controller may be operated independent of and simultaneously with such motor controller when the operator desires to operate the load lifting motor, either simultaneously with or independent of the vehicle propelling motor.

Other objects of this invention will become apparent from the following description, taken in connection with the accompanying drawings and the essential features thereof will be summarized in the claims.

In the drawings, Fig. 1 is a side elevation of an industrial truck embodying my invention; Fig. 2 is a horizontal section and is indicated by the lines 2—2 on Fig. 1; Fig. 3 is a sectional detail of certain of the control mechanisms; Fig. 4 is an electrical diagram of the control mechanisms; Fig. 5 is a perspective of a portion of the control mechanism; Fig. 6 is a sectional detail and is indicated by the lines 6—6 on Fig. 3.

Referring again to the drawings, wherein a preferred embodiment of a truck embodying my invention is shown, there is a main chassis or frame 10, having mounted thereon at its forward end, a pair of driving wheels 12, and adjacent its rear a pair of relatively small load carrying wheels 13. The arrangement is such that all of the wheels of the embodiment illustrated may be dirigibly arranged, so as to turn about individual vertical axes. Standing upwardly from the forward end of the truck is a frame structure, generally indicated at 15, which consists of a suitable support for a gas-electric generating unit, and certain operating controls.

In the embodiment illustrated, a housing 16 is mounted on the frame structure and is adapted to encase the gas engine and the generator unit. Beneath the housing 16 is an electric motor 19, which is connected by suitable driving connections, such as the reduction gearing and differential mechanism generally indicated at 20, to the driving wheels 12.

The various operator's controls, including the steering arm 21, and the pivoted platform members 22, extending forwardly from the truck, and which also comprise part of the control, are mounted at the forward end of the frame structure 15. Rigid with the frame 10 and extending rearwardly therefrom, are a pair of low-swung sill members 25, which, as shown, support a load elevating platform 30 and adjacent their rearmost ends carry the wheels 13.

The platform is generally indicated at 30, and may be of any suitable construction. As shown, it comprises a substantially rectangular member, flanged downwardly at all its edges, as at 31, for strength, and having a supporting plane surface 32 overlying the entire undercarriage or sill structure. The platform has, at its forward edge, an upwardly extending stiffening member 33, which may readily be an angle section. On its underside, and near its rearward end, the platform has a pair of downwardly extending brackets 34, which are connected to a pair of spaced links 35, each of which is pivoted at one end to a bracket 34, and at the other end to the rear sill members 25, as at 36. At the forward end of the platform are downwardly extending brackets 37, which are pivoted to links 38, having suitable pivotal connections to the sill members 25, as at 39.

A suitable power mechanism is provided for swinging the platform 30 to raise and lower the same with the load thereon. This power mechanism may comprise a suitable motor 40, pivoted to the frame structure 10 at 41, and which, through a gear reduction unit 42, drives a ram bar 43, which is pivotally connected to an upstanding ear 44, at the forward end of the platform. The construction is such that as the ram bar is drawn towards the front of the truck, the platform is swung on the pivots 36 and 39 to an elevated position. Likewise, as the ram bar is thrown to the rear (to the right in Fig. 1) the platform is lowered to rest upon the sill members 25.

The electric motors 19 and 40 are controlled by suitable controllers 45 and 46, respectively, which are mounted on the frame structure 15 adjacent the forward or operator's end of the truck. These controllers 45 and 46 are of the rotary drum type, such as is shown in Patent No. 1,783,763, issued to Edward J. Abbe, December 2nd, 1930, and assigned to The Elwell-Parker Electric Company. Such controllers comprises a series of relatively stationary contacts 48, mounted in casings 49 and 49a, which are adapted to contact with rotatable drums 50, having suitable contact members 51 mounted thereon. The usual resistance units are connected in series to the stationary contacts 48 to permit various speeds of motor operation upon the rotation of the drum 50.

The drum 50 in the controller 45 is operatively carried by a shaft 52, journalled in the casing 49. One end of the shaft 52 extends beyond the casing 49, and has mounted thereon an operating arm 53, which is swung to operate the controller to cause the motor 19 to propel the vehicle. Similarly, the drum 50 of the controller 49a is mounted on a shaft 54, which carries an operating handle 55 adapted to be swung by the operator, causing the motor 40 to raise or lower the platform 30, to engage or disengage a load.

The motor generator unit is mounted on the frame 10 within the housing 16, and comprises an internal combustion engine 60, the crank shaft of which is conducted by a flexible coupling 61 to the armature shaft of an electric generator 62. Above the motor 60 is a fuel reservoir 63, which is connected to a carburetor or vaporizer 64, by a suitable conduit 65. The carburetor 64 is of the type ordinarily used in conjunction with internal combustion engines, and is connected to the motor 60 by an intake manifold 66. Located within the manifold 66 is a throttle valve member 67 adapted to restrict the passageway to control the amount of fuel supplied to the engine 60, and thereby govern the speed of rotation of the engine 60 and generator 62.

I prefer to control the speed of the gas engine 60 and the motor generator 62 from the controller 45, which governs the speed of the electric motor 19, to propel the vehicle. To this end I provide the shaft 70 which carries the valve 67 with a lever 71, normally held in a position against a stop 72 by a compression spring 73. The end of the lever 71 is connected to one end of a wire 74, carried by a flexible conduit member 75, the ends of which are secured to stationary parts of the truck, as at 77 and 78. The other end of the wire 74 is secured to the lower end of a rod 80, which is carried in an axial opening 81 in the arm 53 of the controller 45. The rod 80 extends throughout the length of the arm 54 and is provided at its outer end with a suitable handle or knob 83, by means of which it may be readily gripped by the operator of the vehicle.

It will now be seen that when the handle 80 is partially withdrawn from the arm 53, it will draw the wire 74, causing the lever 71 to be rotated counter-clockwise, (Figs. 1 and 3) against the action of the spring 73, thereby increasing the opening of the throttle valve 67 and likewise increasing the speed of the engine 60. When the handle 83 is released, the lever 71 and wire 74 are swung in a clockwise direction (Figs. 1 and 3) by the spring 73, which causes the lever 71 to abut an adjusting screw 85 mounted in the stop 72. This adjusting screw is set so that when the lever 71 abuts it, the valve 67 will be opened just enough to permit sufficient fuel to be drawn through the manifold to prevent the stopping of the engine.

The construction is such that the sliding movement of the rod 80, within the arm 53, is accomplished by a mere turning movement of the knob 83. The rod 80 has an enlarged portion 86 adjacent the knob 83 and which overlies the end of the arm 53. A suitable compression spring 87 carried in an enlarged portion of the axial opening 81 serves to maintain a cam shaped face 88 of the rod portion 86 in contact with the cam shaped surface 89 of the arm. As the knob 83 is turned, the projecting portion 90 of the cam face 88 will ride on the inclined face 91 of the cam face 89, causing the rod 80 to be slid outwardly relative to the arm 53, this sliding movement causing the wire 74 to open the throttle valve 67. The spring 87 preferably exerts sufficient tension on the cam members to return them to their normal position, while the pin 92, which secures the wire 74 to the rod 80, is of such length that it contacts with the face of a disc 93 to which the arm 53 is secured and prevents the rod 80 from making a complete rotation, thereby preventing undue twisting of the wire 74.

In Fig. 3 the controller 45 is shown in its "off" position, the motor 19 is idle, and the carburetor valve 67 is opened. It will be noted that as the knob 83 and its associated rod 80 and arm 53 are swung in a counter-clockwise direction, the wire is wrapped around an outwardly extending boss 95 of the disc 93, on which the arm 53 is mounted. This causes the throttle valve 67 to be opened further as the controller 45 is operated to increase the speed of the motor 19. The position of the parts, as shown in Fig. 3, is such that the speed of the engine 60 will cause the generator 62 to furnish sufficient electrical energy to operate the motor 40 during its entire throw to raise or lower the platform 30 to engage or disengage a load, as desired.

From the foregoing description, it will be apparent that I have provided a control mechanism for a gas-electric powered industrial truck, wherein the operator of the truck may conveniently operate a control with one hand, which will throw into operation the motor which propels the vehicle and which, at the same time, will increase or decrease the speed of the gasoline motor and electrical generator unit to the point where the latter will provide sufficient electrical energy for the motor 19 to propel the vehicle.

The arrangement, as shown, is such that the control is situated in such a manner that it is convenient for the operator, upon leaving the truck, to give the knob 83 a slight twist, thereby decreasing the speed of the engine 60 to its idle running position. This is especially true because, as a rule, the last operation performed by the truck is that of its movement from one place to another. In other words, the last operation the operator performs is usually on the electrical controller 45, which operates the motor 19 to propel the truck. Hence, the operator may, when he throws the controller 45 to an "off" position, with a simple turn of the wrist, return the engine 60 to an idle running position. It has been found that such an arrangement, conveniently located relative to the operator's position, greatly reduces the consumption of gasoline by the motor 60, as well as the wear upon the engine 60 and the generator 62, due to their running at a minimum speed when the truck is idle.

It is likewise evident that, with the construction described, the operator advances the speed of the generator unit at any time the added power is required. This permits the output of the generator to be increased over the automatically operated increase, when road conditions demand it or when the operator desires to propel the truck and simultaneously raise or otherwise handle a load.

I claim:

1. In an industrial truck, a truck frame, driving wheels adapted to support the frame, an electric motor drivingly connected to said driving wheels, a controller for said motor, an operating handle for said controller, an internal combustion engine, an electrical generator drivingly connected with said engine, a fuel supply for said engine, and control means operatively disposed between said fuel supply and said engine adapted to control the speed thereof, means connected with said handle adapted to operate said control means independent of said controller and wherein said last named means is automatically operated when the controller is operated.

2. In an industrial truck, the combination of a frame, driving wheels supporting said frame, an electric motor drivingly connected to said wheels to propel the truck, a load engaging device carried by the truck, an electric motor adapted to operate the load engaging device, an electric generator supported by said frame and adapted to supply electrical energy to operate said electric motors, a controller for each of said motors, an internal combustion engine adapted to drive said generator, said engine including a throttle mechanism, an electric controller interposed between said generator and one of said motors, an operating handle for said controller and means associated with said handle adapted to operate said throttle mechanism whereby said throttle mechanism may be operated independent of said controller or jointly with said controller, as desired.

3. In an industrial truck, an internal combustion motor, a valve mechanism adapted to control the speed of said motor, an electrical generator adapted to be driven by said motor, an electric motor adapted to propel the truck, an electric controller disposed at the forward end of said truck and electrically connected to said motor and said generator, an operating handle for said controller, a plunger in said handle having a cam connection therewith, and means operated by said plunger to control the speed of the internal combustion motor.

4. In combination with an industrial truck, driving wheels adapted to support said truck, an electric motor drivingly connected to said wheels, a load handling mechanism mounted on the truck, a second electric motor adapted to operate the load handling mechanism, an independent controller for each of said motors, an electric generator adapted to supply electrical energy for said motors, an internal combustion engine drivingly connected to the generator, a fuel supply for said engine, a valve mechanism located between said engine and fuel supply and adapted to control the speed of said engine, an operating arm for each of said controllers, a plunger in one of said operating arms and connected to said valve mechanism, wherein the valve mechanism and the controllers may each be operated independent of the others.

5. In combination with an industrial truck, driving wheels mounted on the truck, an electric motor drivingly connected to said wheels, a load handling mechanism mounted on the truck, a second electric motor adapted to operate the load handling mechanism, an independent controller for each of said motors, an electric generator adapted to supply electrical energy for said motors, an internal combustion engine adapted to drive such generator, a fuel supply for said engine, a valve mechanism located between said engine and fuel supply and adapted to control the speed of said engine, and means associated with one of said controllers adapted to increase the speed of said engine automatically, as such controller is operated to increase the speed of its associated motor, and means whereby speed of the engine may be increased over the automatic increase when desired.

6. In combination with a gasoline engine, an electric generator drivingly connected to said engine, an electric motor, an electric controller disposed between said generator and said motor, a handle for said controller, means connected with said handle adapted to automatically increase the speed of said gas engine when the controller is operated, manually operated means to advance the speed of the engine over that caused by the automatic increase and wherein the automatic means will continue to act to further increase the speed of the engine as the controller is operated after the manual increase has been effected.

In testimony whereof, I hereunto affix my signature.

WAVEARD D. PARKER.